United States Patent
Bleau et al.

(10) Patent No.: US 9,712,642 B2
(45) Date of Patent: Jul. 18, 2017

(54) DISTRIBUTED CONTROL OVER CLIENT-SIDE REQUESTS FOR SERVER RESOURCES

(71) Applicant: Apple Inc., Cupertino, CA (US)

(72) Inventors: Darryl N. Bleau, Alberta (CA); Jeffrey T. Davey, San Jose, CA (US); Krishna M. Behara, Santa Clara, CA (US); Jeremy M. Werner, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/874,289

(22) Filed: Oct. 2, 2015

(65) Prior Publication Data
US 2016/0105529 A1    Apr. 14, 2016

Related U.S. Application Data

(63) Continuation of application No. 13/913,301, filed on Jun. 7, 2013, now Pat. No. 9,185,189.

(51) Int. Cl.
*G06F 15/16* (2006.01)
*H04L 29/08* (2006.01)
*H04L 29/06* (2006.01)

(52) U.S. Cl.
CPC .......... *H04L 67/32* (2013.01); *H04L 67/1002* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,055,571 A | 4/2000 | Fulp et al. | |
| 7,013,296 B1 | 3/2006 | Yemini et al. | |
| 7,065,050 B1 | 6/2006 | Herbst | |
| 8,091,088 B2 | 1/2012 | Kishan et al. | |
| 2006/0045100 A1 | 3/2006 | Klausberger et al. | |
| 2009/0219940 A1* | 9/2009 | Jansson | H04L 47/10 370/401 |
| 2012/0158557 A1* | 6/2012 | Minzner | G06Q 40/12 705/30 |
| 2013/0151594 A1 | 6/2013 | Fernandez-Ruiz et al. | |
| 2013/0151595 A1 | 6/2013 | Fernandez-Ruiz et al. | |
| 2013/0263112 A1 | 10/2013 | Fernandez-Ruiz et al. | |

* cited by examiner

*Primary Examiner* — Brian Whipple
(74) *Attorney, Agent, or Firm* — Downey Brand LLP

(57) ABSTRACT

Techniques are disclosed for regulating a flow of requests from a client device to a server. The techniques include the step of receiving, from an application program executing on the client device, a request to perform an operation on the server. The client device determines a current budget value based upon an initial budget value, where the current budget value is reduced by a particular cost each time the server processes a request generated by the application program. The client device then determines a time-adjusted budget value based upon a sum of the current budget value and a regeneration value. Finally, the client device sends to the server the request to perform the operation only when the time-adjusted budget value exceeds a threshold value.

20 Claims, 11 Drawing Sheets

DISTRIBUTED CONTROL OVER CLIENT-SIDE REQUESTS FOR SERVER RESOURCES

CROSS-REFERENCE TO RELATED APPLICATIONS

This application is a continuation of U.S. application Ser. No. 13/913,301, entitled "DISTRIBUTED CONTROL OVER CLIENT-SIDE REQUESTS FOR SERVER RESOURCES," filed Jun. 7, 2013, now U.S. Pat. No. 9,185,189 issued Nov. 10, 2015, the content of which is incorporated herein by reference in its entirety for all purposes.

FIELD

The invention relates generally to computing devices. More particularly, embodiments of the invention relate to a technique for distributed control over client-side requests for server resources.

BACKGROUND

The proliferation of client computing devices—such as smart phones and tablets—has drastically changed the manner in which software applications are designed and executed. Some software applications—such as games—are designed to run independently on the client computing device and require little or no interaction with a server. Other software applications—such as photo sharing applications—rely on accessing server computing devices that are designed to interact with the software applications. Notably, implementing and managing such server computer devices can be complicated and expensive, and often exceeds the resources that are available to the developers. To address this problem, "cloud computing" services were created, which provide scalable computing resources that remove the necessity for a developer to implement his or her own server computing devices.

Despite helping to cure some of the problems set forth above, cloud computing environments can, in some cases, create bottlenecks and degrade overall performance on both the client and server ends. This notion especially applies in cloud computing environments that include a vast number of client computing devices (e.g., one hundred million) that rely on a relatively small number of server computing devices (e.g., ten thousand). Consider, for example, a popular software application that executes on each of the client computing devices and is configured to rely on offloading work to the server computing devices. Notably, if the software application is poorly-written, and causes, for example, a large number of extraneous requests to be inefficiently issued to the server computing devices, then the server computing devices can become overloaded and cause performance degradations across the board.

One approach used to mitigate this problem involves implementing software on the server computing devices that causes them to ignore or defer the extraneous requests that are issued by the client computing devices. However, this approach still does not prevent the client computing devices from issuing the extraneous requests, and, as a result, both the client computing devices and the server computing devices continue to wastefully consume resources. Moreover, such extraneous requests can cause crowding and prevent the server computing devices from appropriately serving other software applications that are properly functioning. Consequently, users who do not have the poorly-written software application installed on their client computing devices—but have other well-written software applications installed on their client computing devices that also access the cloud computing services—can be negatively impacted.

SUMMARY

This paper describes various embodiments that enable a set of client computing devices to locally-control the manner in which software applications executing thereon issue requests for server resources. In particular, a daemon executes on each of the client computing devices and is configured to facilitate communications between the software applications and one or more servers. When a software application is initialized, the daemon requests, from a centralized budget server, corresponding budget information that dictates how and when the software application can utilize the servers. Each request that is issued by the software application is carried out by one or more of the servers, which determine a cost value for carrying out the request. The daemon receives an indication of this cost value and applies the cost value against the budget information for the software application. In this manner, requests generated by a particular software application executing on one or more client computing devices can be throttled by pushing out new budget information to one or more daemons that previously requested budget information for the application. Advantageously, ill-behaving software applications—such as those that erroneously issue a large number of requests to the servers—can be controlled and corrected at the client computing devices and reduce the overall negative impact that would normally occur at the servers.

One embodiment of the invention sets forth a method for regulating a flow of requests from a client device to a server. The method includes the steps of receiving, from an application program executing on the client device, a request to perform an operation on the server. Next, the client device determines a current budget value based upon an initial budget value, where the current budget value is reduced by one or more costs associated with one or more operations performed by the server. The client device then determines a time-adjusted budget value based upon a sum of the current budget value and a regeneration value, where the regeneration value comprises a product of a regeneration rate and an amount of time that has elapsed since determination of the current budget value. Finally, the client device sends the request to perform the operation to the server only when the time-adjusted budget value exceeds a threshold value, such as zero.

Another embodiment of the invention sets forth a non-transitory computer readable storage medium storing instructions that, when executed by a processor included in a client device, cause the processor to implement a method. The method includes the steps of receiving, from an application program executing on the client device, an indication that the application program is initializing, and obtaining budget information that corresponds to the application, where the budget information includes a current budget value. Next, the method includes the step of receiving, from the application program, a first request to perform an operation on a server, issuing the first request to the server, and, in response to the first request, receiving from the server a cost value for performing the operation on the server. The method also includes the final step of updating the budget value based on the cost value.

Yet another embodiment of the invention sets forth a computing system that includes at least one server and at least one client device. According to this embodiment, the client device is configured to receive, from an application program, a request to perform an operation on the at least one server. The client device is also configured to determine a current budget value based upon an initial budget value included in configuration information associated with the application program, where the current budget value is reduced by one or more costs associated with one or more operations performed by the at least one server. The client device is further configured to determine a time-adjusted budget value based upon an amount of time that has passed since the current budget value was last-updated, and, finally, send the request to perform the operation to the at least one server only when the time-adjusted budget value exceeds a threshold value.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

DETAILED DESCRIPTION

Figure 1A:
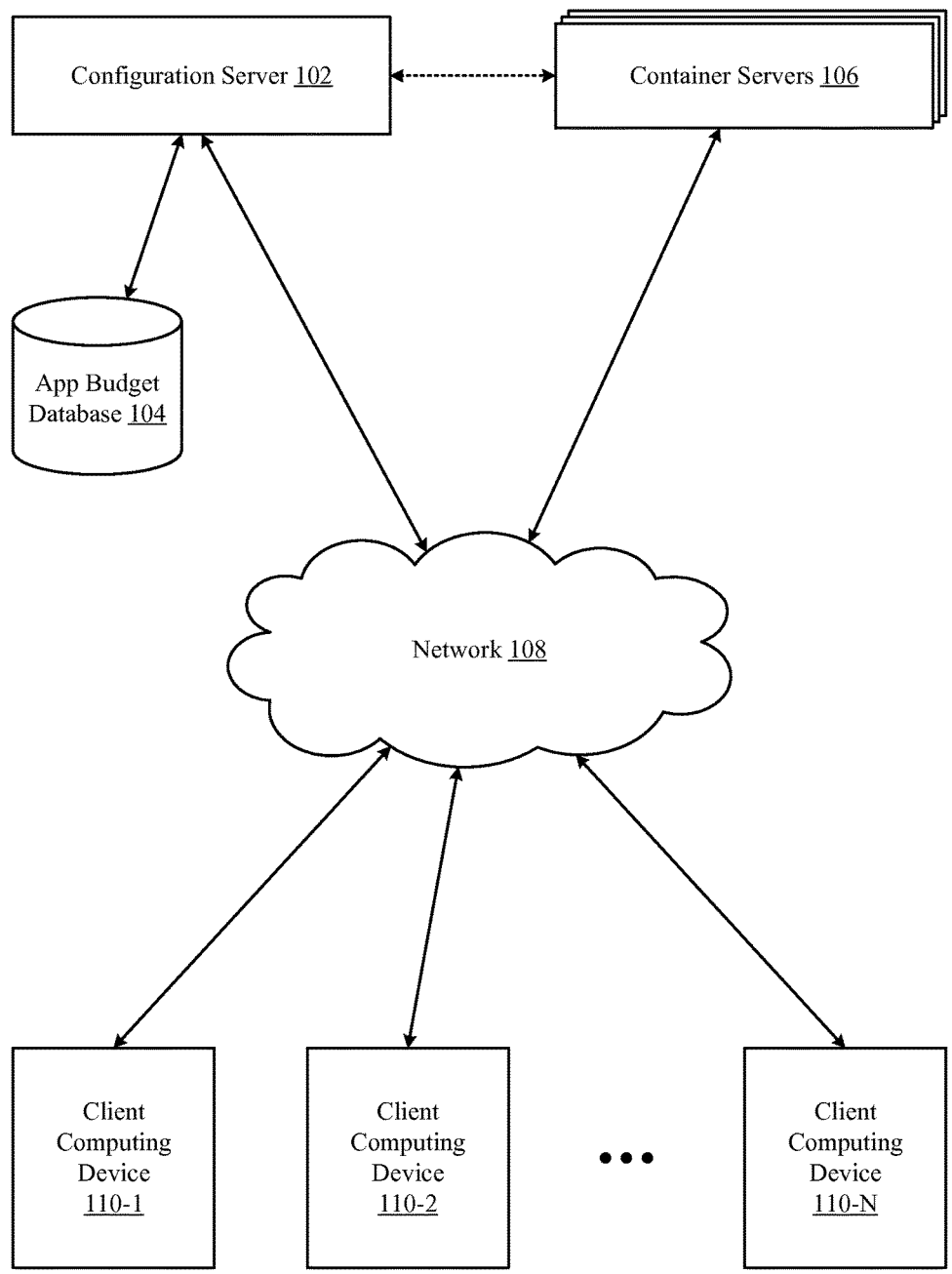
FIGS. 1A-1C illustrate block diagrams of a system configured to implement the various embodiments of the invention.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described above, embodiments of the invention enable client computing devices to locally-control the manner in which applications executing thereon issue requests for server resources. In particular, the embodiments involve implementing a daemon on each of the client computing devices, where the daemon is, for example, a separate operating system process configured to intercept server requests—referred to herein as "container requests"—generated by applications executing on the computing devices and determine if the container requests should be forwarded to one or more container servers for processing. Specifically, when the daemon intercepts a container request from an application, the daemon references budget information associated with the application in order to determine if the application is operating within boundaries that are deemed appropriate by a configuration server, which provides the budget information to the daemon. If the daemon determines that the application is operating within the boundaries, e.g., the available budget value is greater than zero, the daemon forwards the container request to the container servers for processing. Upon completion of processing the container request, the container servers indicate to the daemon a cost value for carrying out the container request, which is applied against the budget information associated with the application. In this manner, the budget information scales based on the activity of the application and enables the daemon to forward container request at the rate deemed appropriate by the configuration server.

As described in greater detail below, the configuration server is configured to interface with both the daemons and the container servers. More specifically, the configuration server can be configured to receive from the container servers processing feedback related to container requests issued by an application executing on one or more client devices. The configuration server can then adjust the budget information for the application based on a variety of factors, including the rate at which the container requests are being received by the container servers, the types of the container requests (e.g., read/write, or based on an application-defined data type associated with the request), the current loads being placed on the container servers by other applications, and the like. For example, if the configuration server determines that the container servers are being flooded by a particular application that is executing on a large number of client computing devices, then the configuration server can tighten the budget information associated with the particular application and push out the tightened budget information to the daemons executing on the client computing devices. Notably, this tightened budget information causes each daemon to, on their respective client computing device, reduce the number of container requests that are actually forwarded to the servers, thereby mitigating the original flooding issue. Notably, the configuration server can be separate from the container servers; or, in another implementation, the configuration server can be part of or combined with at least one of the container servers. For example, the configuration server features described above can be provided by the container servers, with no separate configuration server. Thus, embodiments of the invention enable the client computing devices to act as a first line of defense against malicious or poorly-written applications and help prevent the container servers from being impacted or having to be reconfigured to block or re-route the extraneous requests.

Figure 1B:
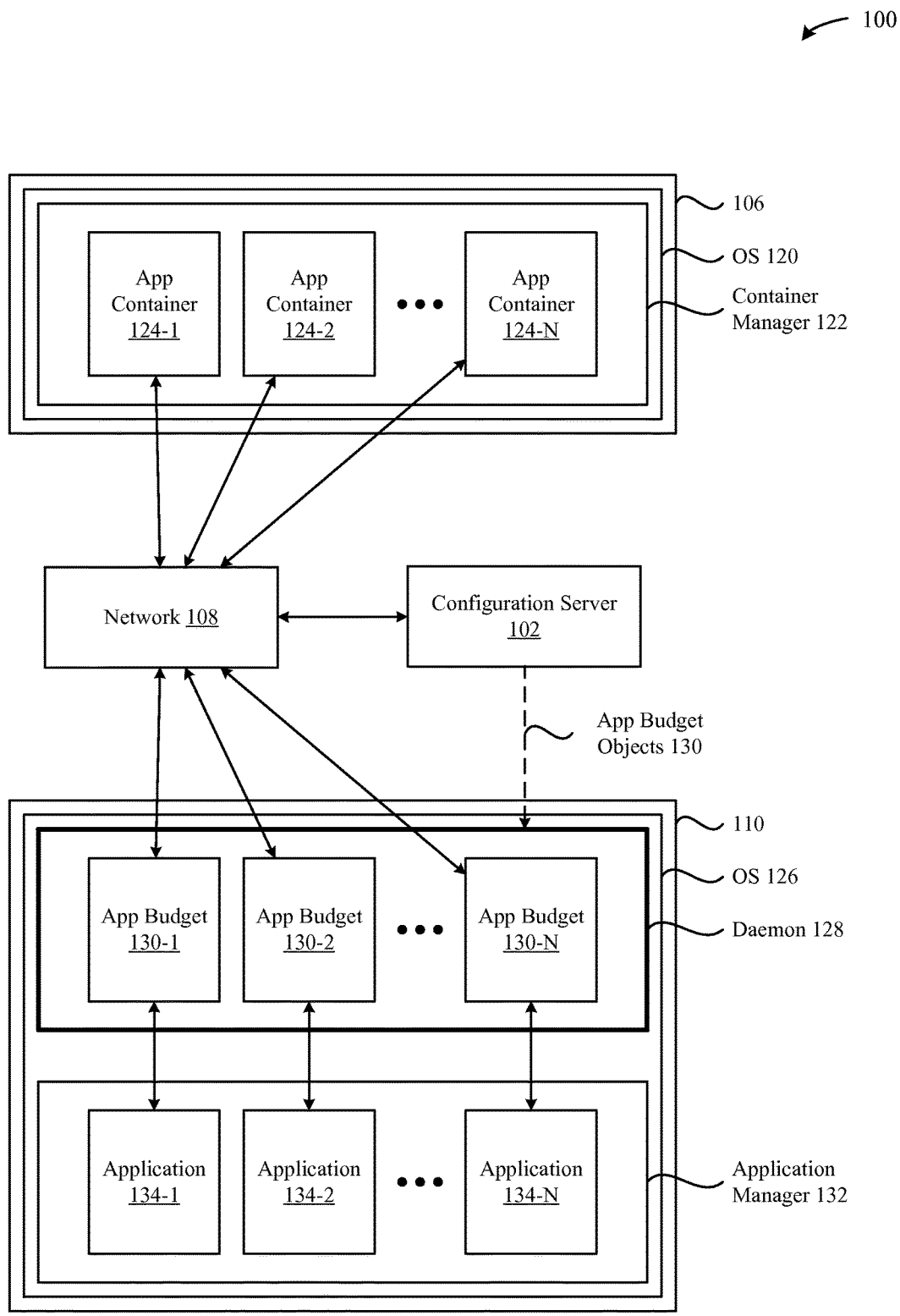
Figure 1C:
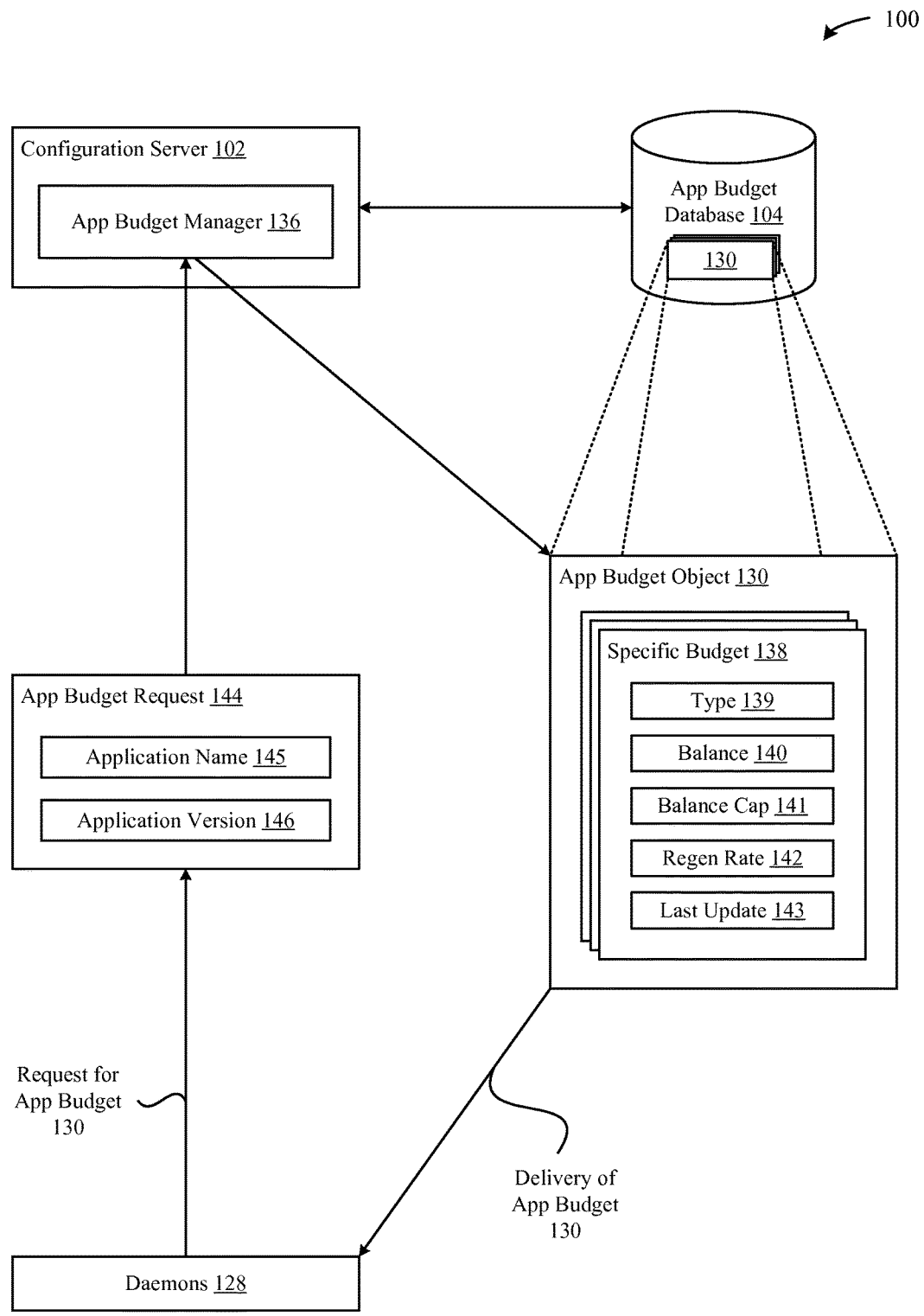

FIGS. 1A-1C illustrate different views of a system 100 configured to implement the various embodiments of the invention. More specifically, FIG. 1A illustrates a high-level overview of the system 100, which includes a configuration server 102, an application budget database 104, container servers 106, a network 108, and client computing devices 110. As mentioned above, each client computing device 110 is configured to execute a daemon that references application budget objects when managing container requests that are generated by applications executing on the client computing device 110. In one aspect, an available budget balance is associated with each executing application, and the daemon prevents application container requests from being sent to the container servers 106 by an application if the application has insufficient available budget, e.g., an available budget balance of zero or less. In one embodiment, the daemon acquires from the configuration server 102 an application budget object for each of the applications that initialize and execute on the client computing device 110. When an application issues a container request to at least one of the container servers 106, the daemon intercepts the container request and analyzes the corresponding application budget object to determine if the container request should be carried out by at least one of the container servers 106. Upon completion of the container request, the container server(s) 106 that carried out the request indicate to the daemon a cost value for handling the container request, which is then used to update the application budget object.

FIG. 1B illustrates a detailed view of a container server 106 and a client computing device 110, according to one embodiment of the invention. As shown in FIG. 1B, the container server 106 executes an operating system 120 that includes a container manager 122. The container manager 122 manages application containers 124, which represent instances of code that are executed in response to container requests that are issued by the applications executing on the client computing device 110. In one embodiment, each application container 124 is a portion of code that is related to a particular application executing on one of the client computing devices 110. For example, an application container 124 can represent a portion of code that is configured to perform a graphics operation on a digital image provided by a photo application executing on a client computing device 110. As described in greater detail below, the container manager 122 is also configured to monitor the execution of each container request and to produce a cost value that represents the overhead required to carry out the container request.

Also illustrated in FIG. 1B is a detailed view of the client computing device 110, which shows that the client computing device 110 executes an operating system 126 that includes both a daemon 128 and an application manager 132. Notably, although the term "daemon" is used herein, the features of the daemon 128 can be implemented in other ways, e.g., as program code that is part of the same process as the application 134 and the application manager 132. Program code that is part of the same process as the application 134 can be invoked more directly by the application 134, e.g., using function calls within the application process. If the daemon 128 is a separate process, then the application 134 and the application manager 132 can communicate with the daemon 128 via interprocess communication. The application manager 132 is configured to facilitate execution of various applications 134 that, as described above, are each associated with an application budget object managed by the daemon 128 and are configured to generate container requests for execution by the container servers 106. Notably, and as described in greater detail below, the daemon 128 is configured to perform a variety of tasks, which include interfacing with the configuration server 102 to obtain application budget objects 130, interfacing with the application manager 132 to receive and process container requests generated by applications 134, and, further, interfacing with the container manager 122 to facilitate execution of the container requests and to process the cost values produced by the container manager 122.

FIG. 1C illustrates a detailed view of the configuration server 102 as well as example implementations of an application budget request 144 and an application budget object 130. As shown in FIG. 1C, the configuration server 102 includes an application budget manager 136, which is configured to process application budget requests 144 generated by daemons 128 in response to the initialization of applications 134 on client computing devices 110. In particular, the application budget request 144 includes an application name 145 and an application version 146 that specify properties of the application 134 that is initializing on the client computing device 110. Notably, the application budget request 144 can include additional parameters (e.g., an application sub-version) to allow for more specific application budget objects 130 that are tuned for various versions of the application 134. The application budget manager 136 receives the application budget request 144 and references the application budget database 104 to identify, if any, an application budget object 130 that matches the parameters included in the application budget request 144. In turn, the application budget manager 136 provides the application budget object 130 to the requesting daemon 128, thereby enabling the daemon 128 to control the manner in which the application 134 is able to issue container requests to the container servers 106.

As shown in FIG. 1C, the application budget object 130 comprises one or more specific budgets 138, which each includes a type 139, a balance 140, a balance cap 141, a regeneration rate 142, and a last update 143. The specific budgets 138 enable multiple, separate budgets to be maintained for different types of container requests that are issued by a particular application 134. For example, the type 139 of a first specific budget 138 can specify read requests while the type 139 of a second specific budget 138 can specify write requests. As another example, the type 139 can be an application-defined operation type or data type associated with the requests, so that different budgets can be placed on different operations performed by the application. For instance, if an application performs several types of operations, with one type of operation using substantially more resources than the others, then the frequency of the expensive operation can be limited while allowing the other operations to be performed more frequently. Examples of such expensive operations include a database query operation that returns a large data set, or an operation that performs a computationally-intensive task. In this manner, the daemon 128 can specifically target the manner in which different types of container requests are issued to the container servers 106. The balance 140 represents a current balance for the specific budget 138, and can be implemented using a primitive data type such as an integer or floating point variable (e.g., 35.5). The balance cap 141 represents the maximum value that the balance 140 can reach, and is typically implemented using the same data type as the balance 140 (e.g., 50.0). The regeneration rate 142 represents the rate at which the balance 140 is increased (e.g., 1.0/minute). Finally, the last update 143 is a timestamp value that represents the last time that the specific budget 138 was modified.

According to the application budget object 130 configuration illustrated in FIG. 1C, frequent updates do not need to be made to the specific budgets 138 at a rate that is commensurate with the regeneration rate 142. For example, if the regeneration rate 142 of a specific budget 138 is "1.0/second", the parameters of the specific budget 138 do not need to be updated once per second. Instead, the parameters of a specific budget 138 can be updated when either a corresponding container request is issued or when a corresponding cost value is generated by the container manager 122. Consider, for example, an example specific budget 138 where the type 139 is set as "read", the balance 140 is set as "34.0", the balance cap 141 is set at "50.0", the regeneration rate 142 is set at "1.0/minute", and the last update 143 is set at "01/01/2013 00:00:00". According to this example, if a container request that corresponds to the example specific budget 138 is issued at "01/01/2013 00:04:00", then the balance 140 is time-adjusted and updated to "38.0" ("34.0+4.0=39.0") and the last update 143 is set at "01/01/2013 00:04:00". Suppose, however, that the container request had alternatively been issued at "01/01/2013 00:30:00". In this alternative example, the balance 140 is time-adjusted and updated to "64.0" ("34.0+30.0=64.0"), which exceeds the balance cap 141 of "50.0". Thus, the balance 140 is capped to "50.0", and the last update 143 is set at "01/01/2013 00:30:00". Notably, this configuration prevents inactive applications 134 from accruing large balances 140, and, further, eliminates the need to make frequent updates to the specific budgets 138 based on the regeneration rates 142, thereby increasing overall efficiency.

As noted above, the parameters of a specific budget 138 are also updated when a cost value is generated by the container manager 122, e.g., in response to processing a container request that corresponds to the specific budget 138. Consider, for example, a cost value of "3.4" that is generated by the container manager 122 and received by a daemon 128 at a current time (e.g., "01/01/2013 00:04:08") in response to carrying out a container request that is associated with an example specific budget 138. Consider further that the example specific budget 138 includes a type 139 that is set as "read", a balance 140 that is set as "38.0", a balance cap 141 that is set at "50.0", a regeneration rate 142 that is set at "1.0/minute", and a last update 143 that is set at "01/01/2013 00:04:00". According to this example, a delta of eight seconds exists between the current time and the last update 143. Accordingly, since the regeneration rate 142 is set at "1.0/minute", the balance 140 is time-adjusted and updated by "0.13" ("(8.0 seconds passed/60.0 seconds per minute)*1.0=0.13") and set to "38.13" ("34.0+0.13=38.13"). However, the cost value of "3.4" is also applied against the updated balance 140, and is accordingly set to "34.73" ("38.13−3.4=34.73").

In view of the foregoing, the various parameters of the specific budget 138—such as the balance 140, the balance cap 141, and the regeneration rate 142—enable the daemon 128 to effectively manage the container requests that are issued by the applications 134. Moreover, and as described in greater detail below, the application budget manager 136 can be configured to receive notification from container servers 106 that a particular application 134 is straining the container servers 106. In response, the application budget manager 136 can identify all daemons 128 that are controlling the particular application 134 and push out an application budget object 130 that corresponds to the particular application 134. This could involve, for example, severely reducing the balance 140, the balance cap 141, and the regeneration rate 142 such that the daemons 128 effectively block an increased number of container requests and prevent a majority of them from ever reaching the container servers 106. In this manner, the daemons 128 throttle the particular application 134 and prevent additional strain from being placed on the container servers 106.

Figure 2:
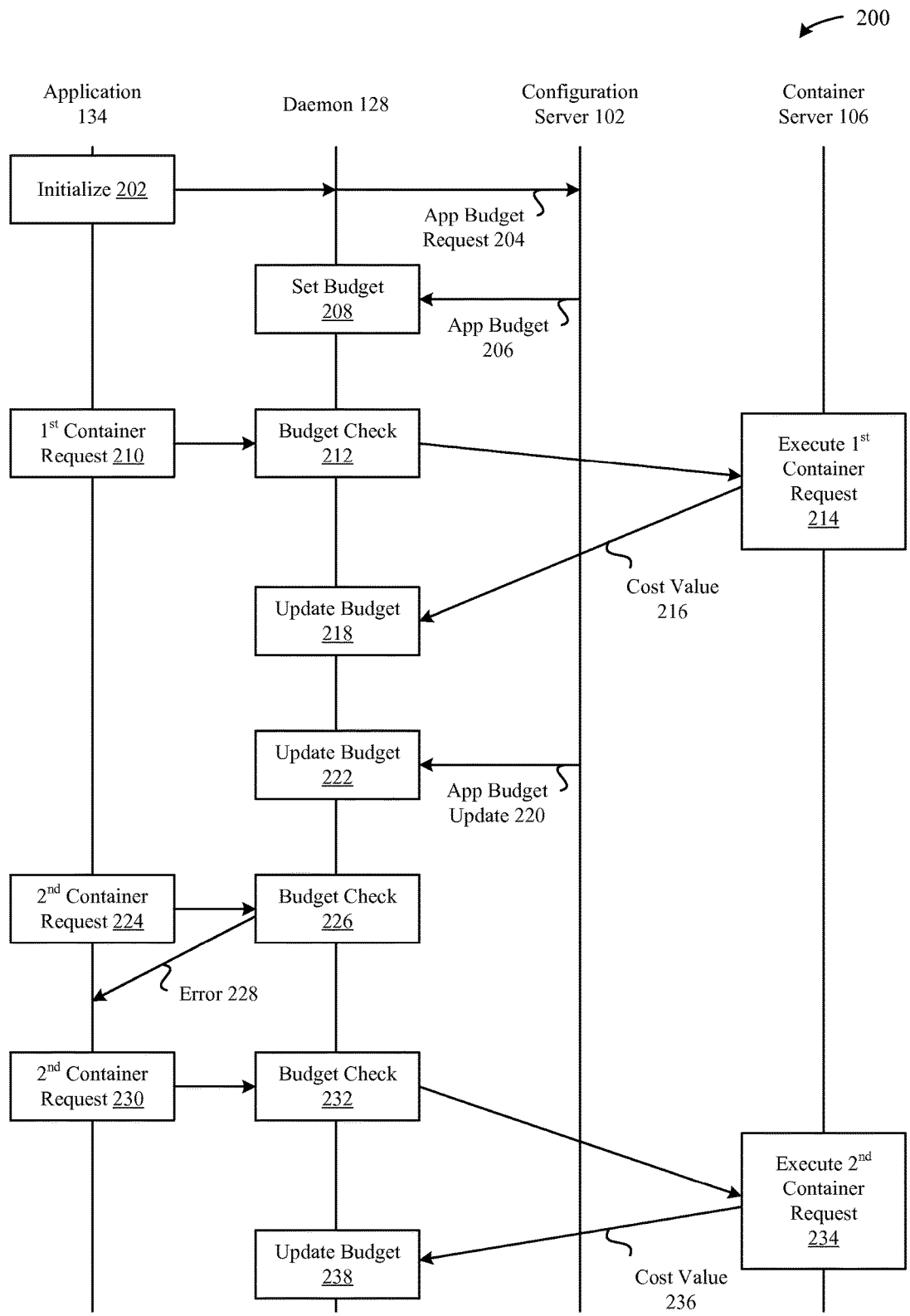
FIG. 2 illustrates a sequence diagram that depicts the manner in which different managing entities communicate with one another to carry out the various embodiments of the invention.

Taken together, FIGS. 1A-1C show that the system 100 is capable of implementing various embodiments of the invention. To supplement FIGS. 1A-1C, FIG. 2 is provided and illustrates an example sequence diagram 200 that depicts the manner in which the different components of the system 100 communicate with one another to carry out the various embodiments of the invention. As shown in FIG. 2, the sequence diagram 200 begins at step 202 and involves an application 134 initializing under the control of the application manager 132. The initialization of the application 134 is reported by the application manager 132 to the daemon 128, whereupon the daemon 128 generates an application budget request 144, and, at step 204, transmits the application budget request 144 to the configuration server 102. At step 206, the configuration server 102, in response to the application budget request 144, returns an application budget object 130 to the daemon 128. In turn, and at step 208, the daemon 128 acknowledges the application budget object 130 and takes the appropriate measures to make the application budget object 130 accessible so that container requests generated by the application 134 can be properly handled.

At step 210, the application 134 generates a first container request and issues the first container request to the daemon 128. At step 212, the daemon 128 checks the application budget object 130 to identify a specific budget 138 included in the application budget object 130 that corresponds to the type of (e.g., read/write) the first container request. The daemon 128 then checks the balance 140 of the identified specific budget 138 to determine if the container request should be forwarded to a container server 106. According to one embodiment, checking the balance 140 comprises determining if the balance is greater than a threshold value of zero, and, if so, the container request is forwarded to the container server 106. Otherwise, if the balance is less than or equal to zero, the container request is not forwarded to the container server 106 and an insufficient balance error is returned to the application 134 indicating that the container request was not forwarded to the container server 106. In one implementation, the balance has a lower limit of zero and does not become negative. In another implementation, the balance can become negative, e.g., if the threshold balance value is a negative number. In one embodiment, the balance values can be partitioned into ranges, such as positive value and negative values, and balance values in different ranges can be treated differently. For example, different regeneration rates can be used for balance values in different ranges, such as a higher regeneration rate for positive balances and a lower regeneration rate for negative balances. An example of such an insufficient balance error occurs at step 228, which is described in greater detail below.

Since, according to the sequence diagram 200, the daemon 128 determines, at step 212, that the balance 140 is greater than zero, the daemon 128 forwards the container request to the container server 106. In turn, at step 214, the container server 106 executes the container request, and, at step 216, the container server 106 generates and returns to the daemon 128 a cost value that represents a total cost for carrying out the container request. This cost value can be generated according to a variety of techniques, and can be based on any measurable parameter within the container server 106, such as, but not limited to, the amount of time required to carry out the container request, the amount of memory consumed by the container request, the processor utilization associated with carrying out the container request (i.e., workload), the network bandwidth usage involved in receiving the container request, the rate or density of container requests issued by the application 134, and the like. At step 218, the daemon 128 receives the cost value and updates the application budget object 130 according to the techniques described above in conjunction with FIG. 1C.

As described above, in some cases, the container server 106 can detect that the application 134 is issuing container requests in an undesirable manner, and, upon detection, notify the configuration server 102. Alternatively, an administrator of the configuration server 102 can manually update the application budget object 130 associated with the application 134 when he or she determines that the application 134 is not functioning properly. In either approach, the updated application budget object 130 is pushed out, e.g., via the network 108, to one or more daemons 128 that are controlling an instance of the application 134 such that any undesirable behavior exhibited by the application 134 can be mitigated at the client computing device 110. In this manner, the overall impact that would normally occur on the container server 106 can be significantly reduced, thereby increasing the overall performance of the system 100. Notably, step 220 represents such an application budget object 130 update, and, as shown at step 222, the daemon 128 updates the application budget object 130 to reflect the new parameters that are transmitted by the configuration server 102.

At step 224, the application 134 generates a second container request and issues the second container request to the daemon 128. However, at step 226, the daemon 128 determines, using the application budget object 130, that the container request should not be forwarded to the container server 106 (i.e., the balance 140 is less than or equal to zero) and, at step 228, returns an insufficient balance error to the application 134. When this occurs, the application 134 can be configured to respond in a variety of ways that are dictated by the developer of the application. For example, the application 134 can be configured to reissue the second container request after a threshold wait period has lapsed, which is represented by the step 230 described below. Alternatively, the application 134 can be configured to notify the developer that the application 134 has exceeded the current parameters of the application budget object 130 so that future versions of the application 134 are more stable and operate within acceptable boundaries.

At step 230, the application 134 reissues the second container request to the daemon 128. Notably, based on the sequence diagram 200, an amount of time has passed and the regeneration rate 142 has caused the balance 140 to increase to a value that is greater than zero. Accordingly, at step 232, the daemon 128 forwards the second container request to the container server 106 to be processed. In turn, at step 234, the container server 106 executes the container request, and generates and returns to the daemon 128 a cost value that represents a total cost for carrying out the container request.

At step 238, the daemon 128 receives the cost value and updates the application budget object 130 according to the techniques described above in conjunction with FIG. 1C.

Although the sequence diagram 200 ends at step 238, those having ordinary skill in the art will understand that the sequence diagram 200 can continue on so long as the application 134 is executing on the client computing device 110 and is issuing container requests to the container server 106. Accordingly, the example sequence diagram 200 provides an overview of how the different components of the system 100 communicate with one another to carry out the various embodiments of the invention. However, to provide additional details, method diagrams are illustrated in FIGS. 3, 4A-4B, 5, and 6A-6B and represent the manner in which each of the components is configured to handle the various requests that are passed between one another within the system 100.

Figure 3:
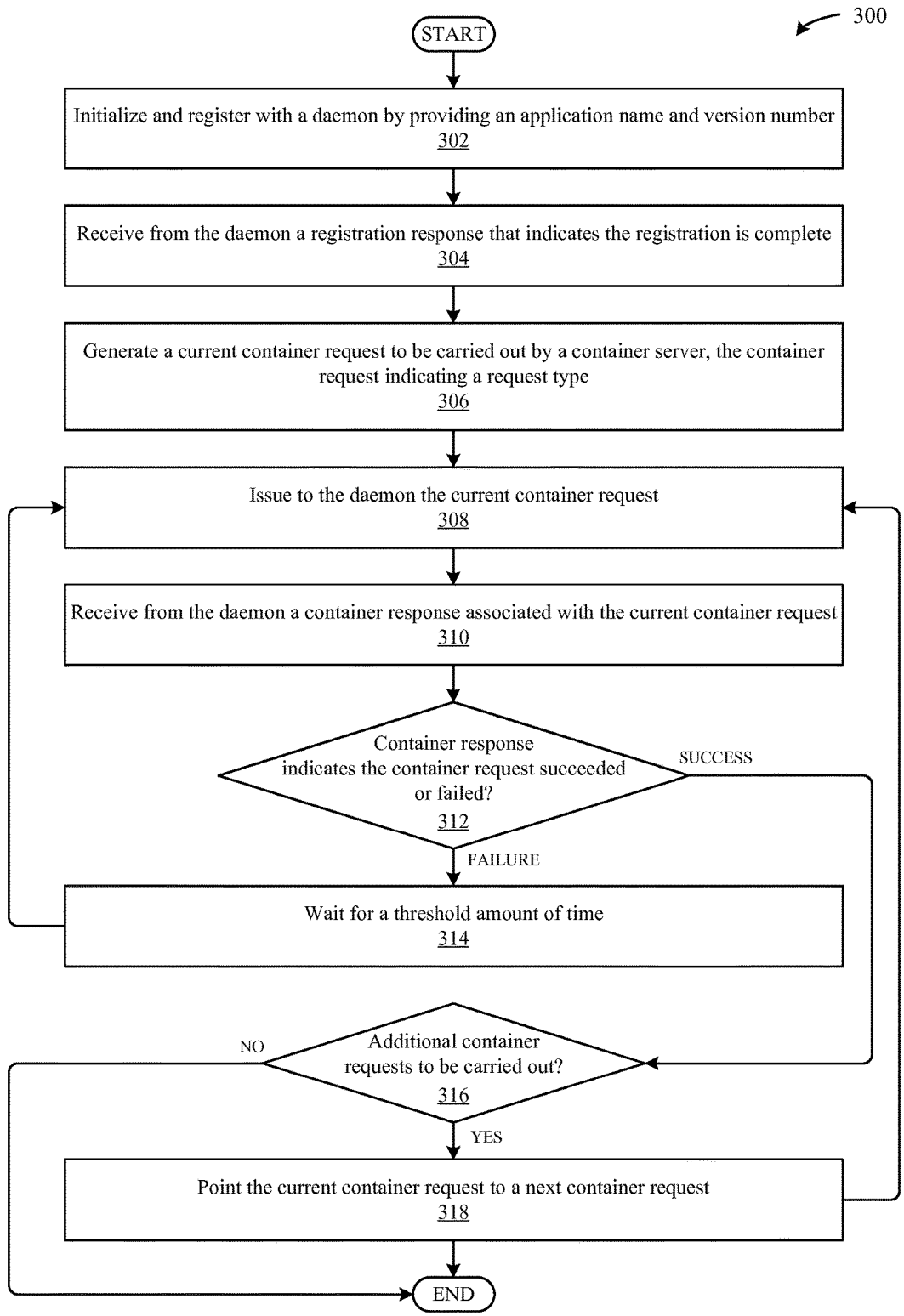
FIG. 3 illustrates a method for generating and managing container requests, according to one embodiment of the invention.

In particular, FIG. 3 illustrates a method 300 for generating and managing container requests, according to one embodiment of the invention. The method 300 can be implemented as, for example, computer program code encoded on a computer readable medium and executable by a processor of a computer system. As shown, the method 300 begins at step 302, where an application 134 initializes and registers with a daemon 128 by providing an application name and a version number. As described above in conjunction with FIG. 1C, the application name and version number can be provided via the properties included in an application budget request 144. At step 304, the application 134 receives from the daemon 128 a registration response that indicates the registration is complete. This registration response is issued by the daemon 128 after the daemon 128 receives from the configuration server 102 an application budget object 130 that corresponds to the application 134. Alternatively, in another implementation, the registration, or parts of the registration, such as communicating the application budget object 130 to the configuration server 102, can be deferred until the server 102 receives a container request for the application 134. The budget checking can be omitted for the first request from an application 134, e.g., to permit configuration operations to be performed by the server 102 in response to the first request. In other words, the application can be permitted to make at least one unchecked request. At step 306, the application 134 generates a current container request to be carried out by a container server 106, where the current container request indicates a request type that corresponds to a type 139 property of a specific budget 138 included in the application budget object 130. In another implementation, the configuration server 102 can perform the actions of the configuration server 102, in which case no separate configuration server 102 is needed.

At step 308, the application 134 issues to the daemon 128 the current container request. As described above, the daemon 128, in response to receiving the current container request, determines, using the application budget object 130, whether the current container request should be forwarded to the configuration server 102. If the daemon 128 determines that the current container request should not be forwarded to the container server 106, e.g., if the balance 140 of the specific budget 138 is less than or equal to zero, then the daemon 128 issues to the application 134 a container response that indicates that the current container request failed and was not forwarded to the container server 106. Alternatively, if the daemon 128 determines that the current container request should be forwarded to the container server 106, e.g., if the balance 140 of the specific budget 138 is greater than zero, then the daemon 128 issues to the application 134 a container response that indicates the current container request succeeded and was forwarded to the container server 106.

Accordingly, at step 310, the application 134 receives from the daemon 128 a container response associated with the current container request. At step 312, the daemon 128 determines whether the container response indicates that the current container request succeeded or failed. If, at step 312, the application 134 determines that the container response indicates that the current container request failed, then the application 134 can wait or perform other tasks for a threshold amount of time at step 314 before the method 300 proceeds back to step 308, where the application 134 can reissue the current container request. Alternatively, if the application 134 determines that the container response indicates that the current container request succeeded, then the method 300 proceeds to step 316. At step 316, the application 134 determines if there are additional container requests to be carried out. In one embodiment, container requests generated by the application 134 are stored in a queue and are sequentially issued to the daemon 128. According to this embodiment, each container request remains in the queue until the daemon 128 indicates to the application 134 via step 312 that the container request was successfully carried out by the container server 106.

If, at step 316, the application 134 determines that there are additional container requests to be carried out, then the method 300 proceeds to step 318. At step 318, the application 134 points the current container request to a next container request, and the method 300 proceeds back to step 308 such that the current container request—which, after step 318, points to the next container request—is issued to the daemon 128. The application 134 continues to operate according to the method 300 so long as the application 134 is generating container requests.

Figure 4A:
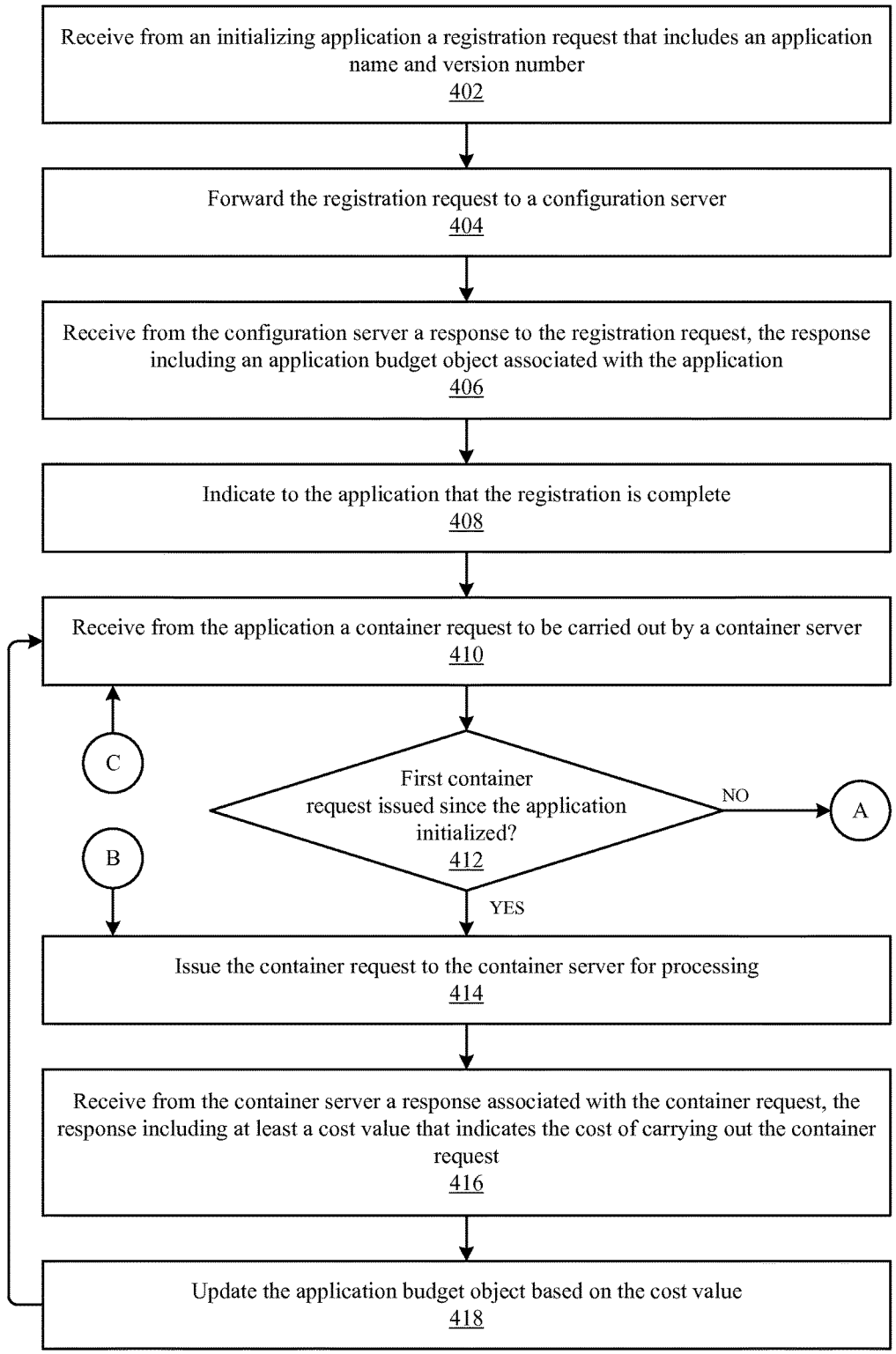
FIGS. 4A-4B illustrate a method for receiving container requests and forwarding the container requests based on budget information, according to one embodiment of the invention.
Figure 4B:
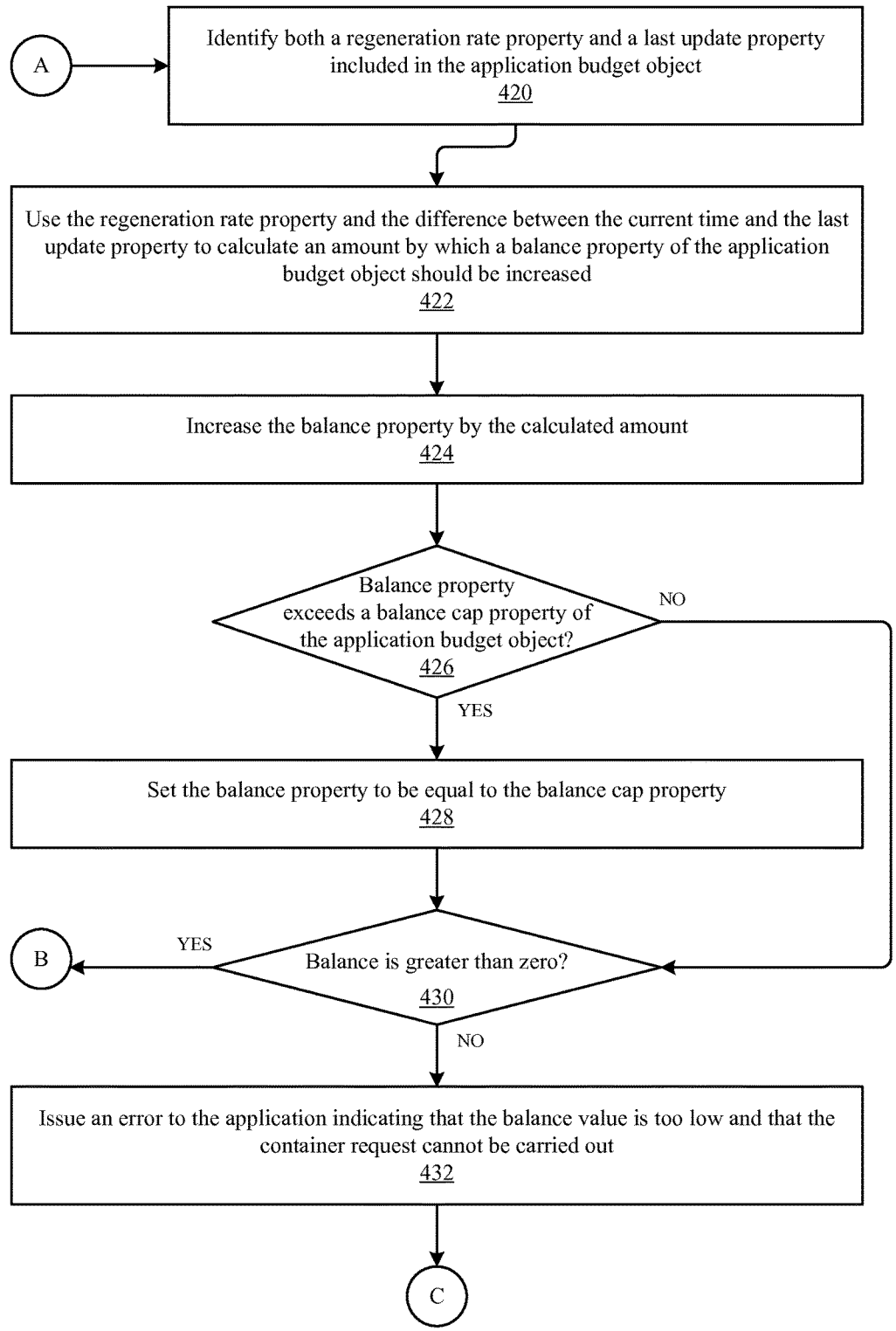

FIGS. 4A-4B illustrate a method 400 for receiving container requests and forwarding the container requests based on budget information, according to one embodiment of the invention. The method 400 can be implemented as, for example, computer program code encoded on a computer readable medium and executable by a processor of a computer system. As shown, the method 400 begins at step 402, where the daemon 128 receives from an initializing application 134 a registration request that includes an application name and version number. At step 404, the daemon 128 forwards the registration request to the configuration server 102, which in turn references the application budget database 104 to identify an application budget object 130 that corresponds to the application 134 (via the information included in the registration request). Notably, and as described in greater detail below in conjunction with FIG. 6A, the configuration server 102 can be configured to return a default application budget object 130 when the application budget database 104 does not include an application budget object 130 that corresponds to the application 134. At step 406, the daemon 128 receives from the configuration server 102 a response to the registration request, the response including an application budget object 130 that corresponds to the application 134. At step 408, the daemon 128 indicates to the application 134 that the registration is complete.

At step 410, the daemon 128 receives from the application 134 a container request to be carried out by a container server 106. At step 412, the daemon 128 determines whether the container request received at step 410 is the first container request issued since the application 134 initialized. Notably, the daemon 128 performs this initial check since the application budget object 130 has not yet been modified, for example, by a cost value returned by the container server 106 after processing a container request. If, at step 412, the daemon 128 determines that the container request is the first container request issued since the application 134 initialized, then the method 400 proceeds to step 414. Otherwise, the method 400 proceeds to step 420, which is described in greater detail below. At step 414, the daemon 128 issues the container request to the container server 106 for processing.

At step 416, the daemon 128 receives from the container server 106 a response associated with the container request, the response including at least a cost value that indicates the cost of carrying out the container request. At step 418, the daemon 128 updates the balance 140 of the specific budget 138 that is included in the application budget object 130 and corresponds to a type of container request. The method 400 then proceeds back to step 410, where the daemon 128 waits for other container requests to be issued by the application 134.

Referring back now to step 420, the daemon 128 identifies both the regeneration rate 142 and the last update 143 included in the specific budget 138 (that is included in the application budget object 130). At step 422, the daemon 128 uses the regeneration rate 142 and the difference between the current time and the last update 143 to calculate an amount by which the balance 140 of the specific budget 138 should be increased. At step 424, the daemon 128 increases the balance 140 by the calculated amount.

At step 426, the daemon 128 determines whether the balance 140 exceeds the balance cap 141 of the specific budget 138 (that is included in the application budget object 130). If, at step 426, the daemon 128 determines that balance 140 exceeds the balance cap 141, then the method 400 proceeds to step 428. Otherwise, the method 400 proceeds to step 430. At step 430, the daemon 128 determines whether the balance 140 is greater than zero. If, at step 430, the daemon 128 determines that balance 140 is greater than zero, then the method 400 proceeds back to step 414, which is carried out according to the techniques described above. Otherwise, the method 400 proceeds to step 432, where the daemon 128 issues an error to the application 134 indicating that the balance 140 of the budget is too low and that the container request cannot be carried out.

Figure 5:
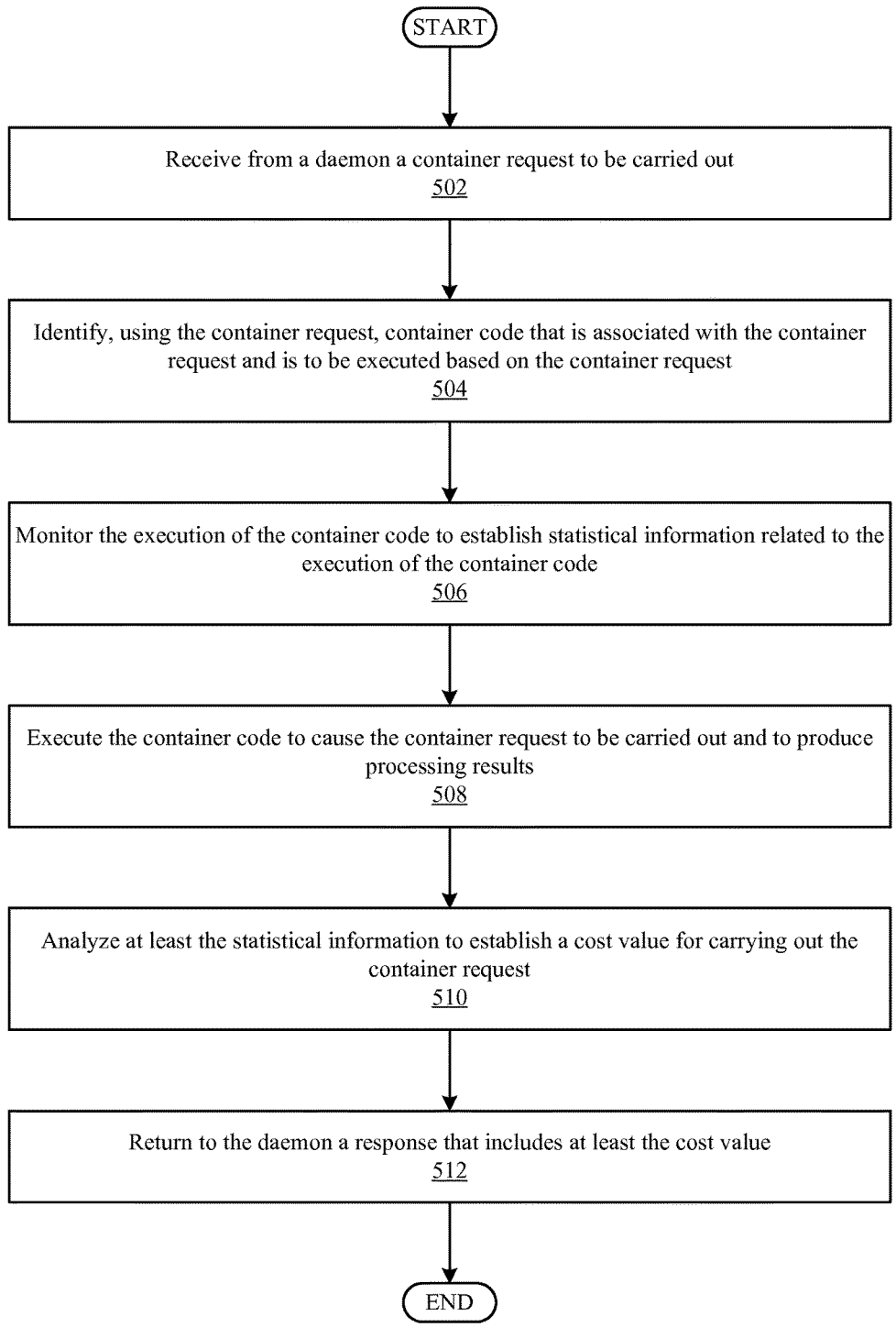
FIG. 5 illustrates a method for processing a container request and generating a cost value based on the processing of the container request, according to one embodiment of the invention.

FIG. 5 illustrates a method 500 for processing a container request and generating a cost value based on the processing of the container request, according to one embodiment of the invention. The method 500 can be implemented as, for example, computer program code encoded on a computer readable medium and executable by a processor of a computer system. As shown, the method 500 begins at step 502, where the container manager 122 receives from a daemon 128, e.g., via the network 108, a container request to be carried out. At step 504, the container manager 122 identifies, using the container request, container code, e.g., the application container 124, that is associated with the container request and is to be executed based on the container request. At step 506, the container manager 122 monitors the execution of the container code to establish statistical information related to the execution of the container code. At step 508, the container manager 122 executes the container code to cause the container request to be carried out and to produce processing results. At step 510, the container manager 122 analyzes at least the statistical information to establish a cost value for carrying out the container request. At step 512, the container manager 122 returns to the daemon 128, e.g., via the network 108, a response that includes at least the cost value.

Figure 6A:
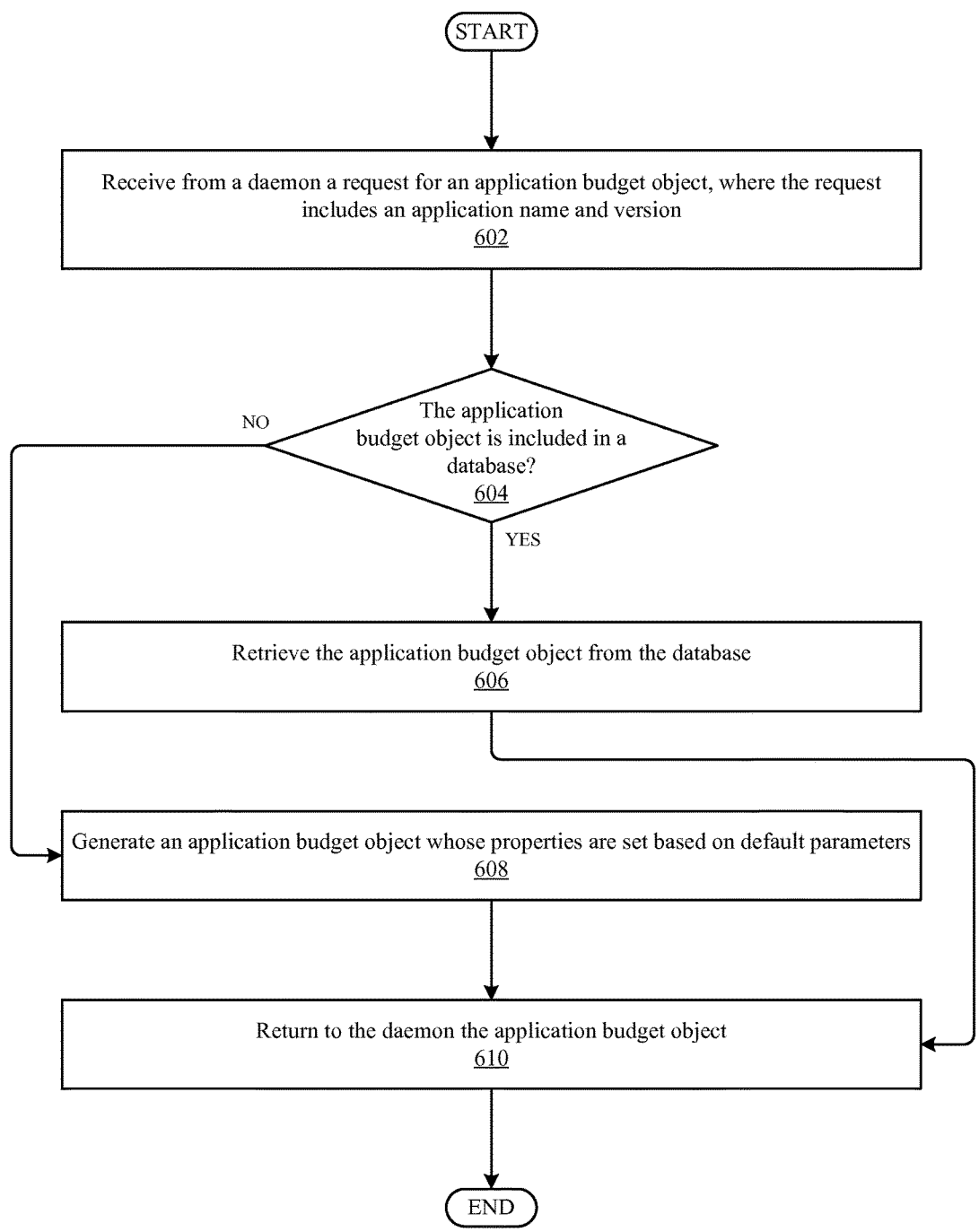
FIG. 6A illustrates a method for delivering budget information, according to one embodiment of the invention.

FIG. 6A illustrates a method 600 for delivering budget information, according to one embodiment of the invention. The method 600 can be implemented as, for example, computer program code encoded on a computer readable medium and executable by a processor of a computer system. In one example, the method 600 can be performed by a container server 106. As shown, the method 600 begins at step 602, where the application budget manager 136 receives from a daemon 128, e.g., via the network 108, a request for an application budget object 130 that corresponds to an application 134 that is being initialized. At step 604, the application budget manager 136 determines whether the application budget object 130 is included in the application budget database 104. If, at step 604, the application budget manager 136 determines that the application budget object 130 is included in the application budget database 104, then the method 600 proceeds to step 606. Otherwise, the method 600 proceeds to step 608, described below. At step 606, the application budget manager 136 retrieves the application budget object 130 from the application budget database 104. At step 608, since no application budget object 130 exists for the application 134, the application budget manager 136 generates an application budget object 130 whose properties are set based on default parameters. At step 610, the application budget manager 136 returns to the daemon 128 the application budget object 130, e.g., via the network 108.

Figure 6B:
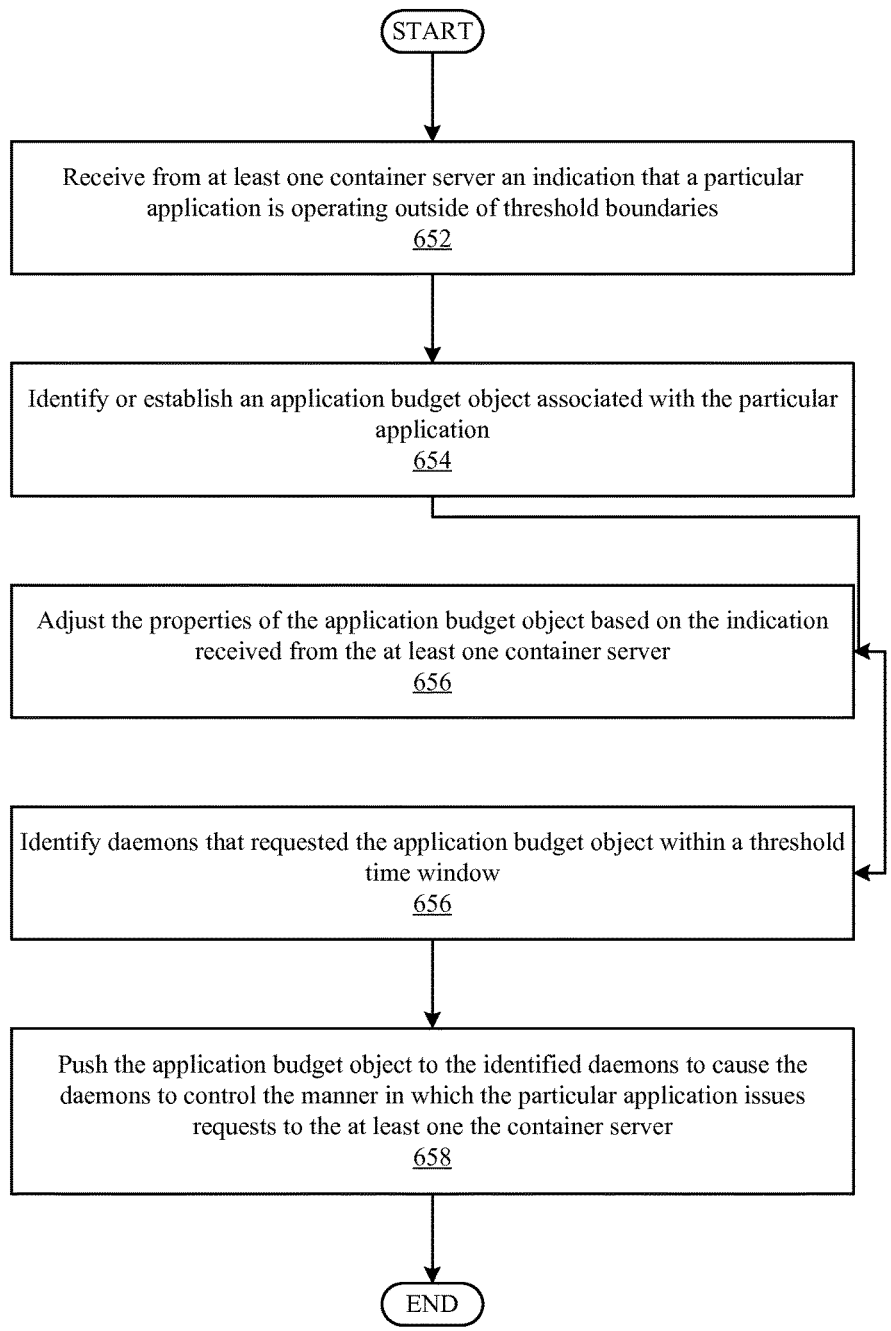
FIG. 6B illustrates a method for updating budget information, according to one embodiment of the invention.

FIG. 6B illustrates a method 650 for updating budget information, according to one embodiment of the invention. The method 650 can be implemented as, for example, computer program code encoded on a computer readable medium and executable by a processor of a computer system. In one example, the method 650 can be performed by a container server 106. As shown, the method 650 begins at step 652, where the application budget manager 136 receives from at least one container server 106 an indication that a particular application 134 is operating outside of threshold boundaries. At step 654, the application budget manager 136 identifies or establishes an application budget object 130 associated with the particular application. At step 656, the application budget manager 136 adjusts the properties of the application budget object 130 based on the indication received from the at least one container server 106. For example, if the indication shows that the application 134 is stuck in an infinite loop and is continuously issuing container requests, then the application budget manager 136 can set the balance 140 to a value of "0.0", the balance cap 141 to a value of "0.0", and/or the regeneration rate 142 to a value of "0.0/sec" for each specific budget 138 included in the application budget object 130.

At step 656, the application budget manager 136 identifies daemons that requested the application budget object 130 within a threshold time window (e.g., one hour), which can be set by an administrator. At step 658, the application budget manager 136 pushes the application budget object 130 to the identified daemons 128 to cause the daemons 128 to control the manner in which the particular application 134 issues requests to the at least one the container server 106.

Figure 7:
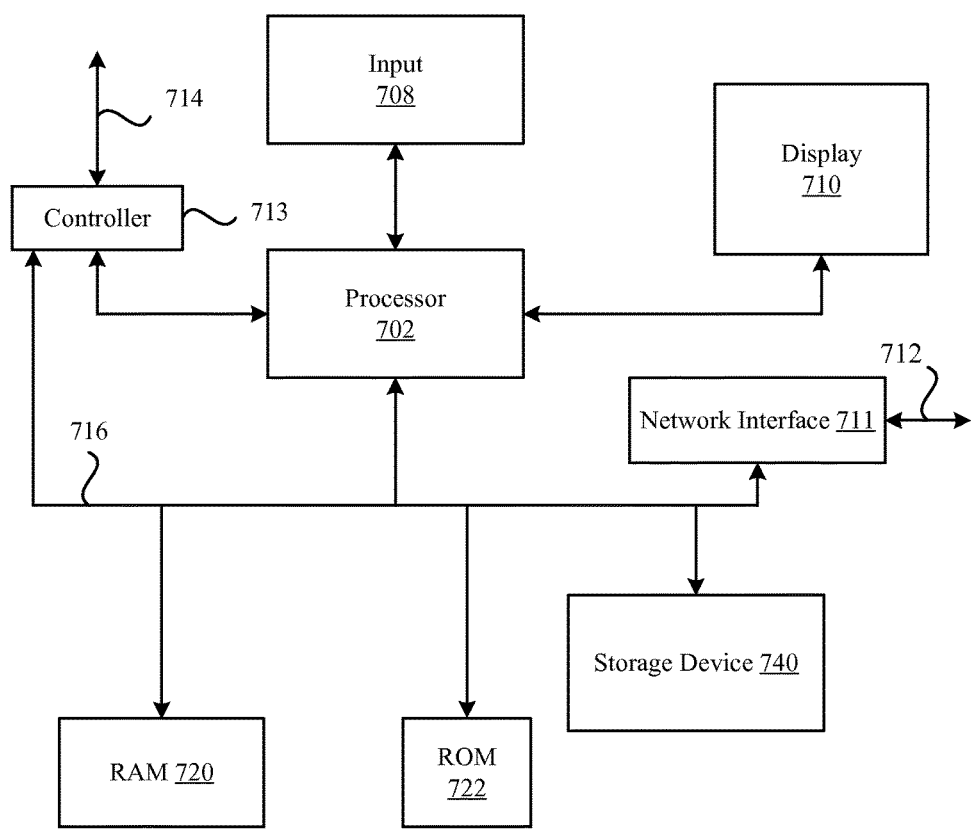
FIG. 7 illustrates a detailed view of a computing device that represents the client computing devices and server devices described herein, according to one embodiment of the invention.

FIG. 7 is a block diagram of a computing device 700 that can represent the components of a configuration server 102, a container server 106, or a client computing device 110 in one or more embodiments. As shown in FIG. 7, the computing device 700 can include a processor 702 that represents a microprocessor or controller for controlling the overall operation of computing device 700. The computing device 700 can also include user input device 708 that allows a user of the computing device 700 to interact with the computing device 700. For example, user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by processor 702 to display information to the user. Data bus 716 can facilitate data transfer between at least storage devices 740, processor 702, and controller 713. Controller 713 can be used to interface with and control different equipment through equipment control bus 714. The computing device 700 can also include a network/bus interface 711 that couples to data link 712. Data link 712 can allow the computing device 700 to couple to a host computer or to accessory devices. The data link 712 can be provided over a wired connection or a wireless connection. In the case of a wireless connection, network/bus interface 711 can include a wireless transceiver.

The computing device 700 also includes storage devices 740, which can comprise a single disk or a plurality of disks (e.g., hard drives). In some embodiments, storage devices 740 can include flash memory, semiconductor (solid state) memory or the like. The computing device 700 can also include Random Access Memory (RAM) 720 and Read-Only Memory (ROM) 722. The ROM 722 can store programs, utilities or processes to be executed in a non-volatile manner. The RAM 720 can provide volatile data storage, and stores instructions related to components of a storage management module that is configured to carry out the various techniques described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for regulating a flow of requests issued by client devices, the method comprising, at a server device:
    receiving, from a daemon executing on a client device, a request for performing at least one operation on the server device, wherein:
        the daemon provides the request on behalf of an application executing on the client device, and the at least one operation is associated with the application;
providing, in response to the request and to the daemon, budget information associated with the application, wherein the budget information indicates to the daemon that the request is valid;
carrying out the at least one operation on the server device; and
upon detecting that the application is operating outside of at least one threshold boundary:
identifying at least one target daemon executing on a respective target client device that provides requests on behalf of a respective instance of the application executing on the respective target client device, and
providing, to the at least one target daemon, updated budget information that temporarily prevents the at least one target daemon from issuing subsequent requests to the server device on behalf of the respective instance of the application.

2. The method of claim 1, wherein the budget information is stored at a budget database associated with the server device.

3. The method of claim 1, wherein the budget information includes a balance having a value of greater than zero.

4. The method of claim 1, wherein the budget information is based on a default budget associated with the application.

5. The method of claim 1, wherein the request includes an application name and an application version associated with the application.

6. The method of claim 1, further comprising, subsequent to carrying out the at least one operation on the server device:
decreasing a value of a balance included in the budget information.

7. The method of claim 1, wherein the request includes at least one of a type, a balance, a balance cap, a regeneration rate, or a last update associated with the application.

8. The method of claim 1, wherein the updated budget information indicates a zero balance to prevent the at least one target daemon from issuing the subsequent requests.

9. A non-transitory computer readable storage medium configured to store instructions that, when executed by a processor included in a server device, cause the server device to regulate a flow of requests issued by client devices, by carrying out steps that include:
receiving, from a daemon executing on a client device, a request for performing at least one operation on the server device, wherein:
the daemon provides the request on behalf of an application executing on the client device, and
the at least one operation is associated with the application;
providing, in response to the request and to the daemon, budget information associated with the application, wherein the budget information indicates to the daemon that the request is valid;
carrying out the at least one operation on the server device; and
upon detecting that the application is operating outside of at least one threshold boundary:
identifying at least one target daemon executing on a respective target client device that provides requests on behalf of a respective instance of the application executing on the respective target client device, and
providing, to the at least one target daemon, an updated budget that temporarily prevents the at least one target daemon from issuing subsequent requests to the server device on behalf of the respective instance of the application.

10. The non-transitory computer readable storage medium of claim 9, wherein the budget information is stored at a budget database associated with the server device.

11. The non-transitory computer readable storage medium of claim 9, wherein the budget information includes a balance having a value of greater than zero.

12. The non-transitory computer readable storage medium of claim 9, wherein the budget information is based on a default budget associated with the application.

13. The non-transitory computer readable storage medium of claim 9, where in the steps further include, subsequent to carrying out the at least one operation on the server device:
decreasing a value of a balance included in the budget information.

14. The non-transitory computer readable storage medium of claim 9, wherein the request includes at least one of a type, a balance, a balance cap, a regeneration rate, or a last update associated with the application.

15. The non-transitory computer readable storage medium of claim 9, wherein the updated budget information indicates a zero balance to prevent the at least one target daemon from issuing the subsequent requests.

16. A server device configured to regulate a flow of requests issued by client devices, the server device comprising:
a processor; and
a memory storing instructions that, when executed by the processor, cause the server device to:
receive, from a daemon executing on a client device, a request for performing at least one operation on the server device, wherein:
the daemon provides the request on behalf of an application executing on the client device, and
the at least one operation is associated with the application;
provide, in response to the request and to the daemon, budget information associated with the application, wherein the budget information indicates to the daemon that the request is valid;
carry out the at least one operation on the server device; and
upon detecting that the application is operating outside of at least one threshold boundary:
identify at least one target daemon executing on a respective target client device that provides requests on behalf of a respective instance of the application executing on the respective target client device, and
provide, to the at least one target daemon, an updated budget that temporarily prevents the at least one target daemon from issuing subsequent requests to the server device on behalf of the respective instance of the application.

17. The server device of claim 16, wherein the budget information is stored at a budget database associated with the server device.

18. The server device of claim 16, wherein the request includes an application name and an application version associated with the application.

19. The server device of claim 16, wherein the processor further causes the server device to, subsequent to carrying out the at least one operation on the server device:
decrease a value of a balance included in the budget information.

20. The server device of claim 16, wherein the request includes at least one of a type, a balance, a balance cap, a regeneration rate, or a last update associated with the application.

* * * * *